United States Patent
Chalhoub

(10) Patent No.: US 7,407,215 B2
(45) Date of Patent: Aug. 5, 2008

(54) CHILD SEAT TOP TETHER REROUTER AND BRACKET

(75) Inventor: George Mike Chalhoub, Livonia, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/612,505

(22) Filed: Dec. 19, 2006

(65) Prior Publication Data

US 2007/0182195 A1  Aug. 9, 2007

Related U.S. Application Data

(60) Provisional application No. 60/765,691, filed on Feb. 6, 2006.

(51) Int. Cl.
*B60N 2/26* (2006.01)
*B60N 2/44* (2006.01)

(52) U.S. Cl. .............. 296/68.1; 296/187.05; 296/65.03; 296/1.04; 297/470; 297/250.1

(58) Field of Classification Search ............ 296/187.05, 296/68.1, 65.02, 65.03, 63, 1.04, 1.08, 187.03; 297/250.1, 253, 216.11, 470–472, 254; 280/805
See application file for complete search history.

(56) References Cited

U.S. PATENT DOCUMENTS

| 3,157,432 | A | | 11/1964 | Watkins |
|---|---|---|---|---|
| 4,099,770 | A | | 7/1978 | Elsholz et al. |
| 5,642,916 | A | * | 7/1997 | Dybro et al. ............ 297/216.18 |
| 5,941,601 | A | | 8/1999 | Scott et al. |
| 6,095,604 | A | | 8/2000 | Stack et al. |
| 6,254,183 | B1 | | 7/2001 | Bian et al. |
| 6,354,648 | B1 | | 3/2002 | Allan et al. |
| 6,517,154 | B2 | * | 2/2003 | Sawamoto ............. 297/216.11 |
| 6,932,407 | B2 | * | 8/2005 | Cuerrier et al. ............... 296/63 |
| 7,114,590 | B2 | * | 10/2006 | McFalls et al. .............. 180/268 |
| 2001/0013716 | A1 | | 8/2001 | Hayashi et al. |
| 2002/0008416 | A1 | | 1/2002 | Deptolla |
| 2002/0030393 | A1 | | 3/2002 | Galbreath |
| 2005/0212321 | A1 | | 9/2005 | Yamamoto |
| 2007/0046014 | A1 | * | 3/2007 | Glover et al. ............... 280/805 |
| 2007/0194590 | A1 | * | 8/2007 | Bertoli et al. .............. 296/68.1 |

FOREIGN PATENT DOCUMENTS

EP  0552570 A2  7/1993
JP  2003-335160  11/2003

* cited by examiner

*Primary Examiner*—Jason S Morrow
(74) *Attorney, Agent, or Firm*—Gifford, Krass, Sprinkle, Anderson & Citkowski, P.C.

(57) ABSTRACT

A tether anchor assembly is coupled to a vehicle allowing a child seat tether to be connected thereto. The anchor assembly includes a mounting bracket, a receiver bracket, a nylon loop and a boot. The mounting bracket is configured to be fixedly secured to the vehicle. The nylon loop extends through both the mounting bracket and receiver bracket. The boot includes a channel for concealing the receiver bracket and the loop when not in use.

13 Claims, 4 Drawing Sheets

CHILD SEAT TOP TETHER REROUTER AND BRACKET

CROSS REFERENCE TO RELATED APPLICATIONS

This application claims priority to U.S. Provisional Patent Application No. 60/765,691 filed on Feb. 6, 2006, the content of which is incorporated herein by reference in its entirety.

BACKGROUND OF THE INVENTION

1. Field of the Invention

The invention relates to tether anchors for securing child seats to automotive vehicles. More particularly, the invention relates to a tether anchor that is concealable in a boot when it is not in use.

2. Description of the Related Art

Automotive vehicles include top tethers for connecting child seats to tether brackets secured to the vehicle. It is known in the prior art to utilize a rubber band for holding a loop and anchor in a stowed position when not in use. Rubber bands are not, however, user friendly. Further, rubber bands have a 'cheap' appearance and are not robust for day-to-day use.

It remains desirable to provide an improved tether arrangement that provides a better appearance for the loop and anchor when not in use, and is more user friendly compared to conventional designs.

SUMMARY OF THE INVENTION

According to one aspect of the invention, a tether anchor assembly is provided for securing a child seat tether to a seat in a vehicle. The tether anchor assembly includes a receiver bracket for securing the child seat tether thereto. A mounting bracket is adapted to be fixedly secured to the vehicle. A strap extends through the receiver and mounting brackets. A boot is configured to be retained to the mounting bracket. The boot has a channel for receiving and concealing the receiver bracket and the strap therein when not in use.

BRIEF DESCRIPTION OF THE DRAWINGS

Advantages of the present invention will be readily appreciated as the same becomes better understood by reference to the following detailed description when considered in connection with the accompanying drawing, wherein.

DETAILED DESCRIPTION OF THE INVENTION

Figure 1:
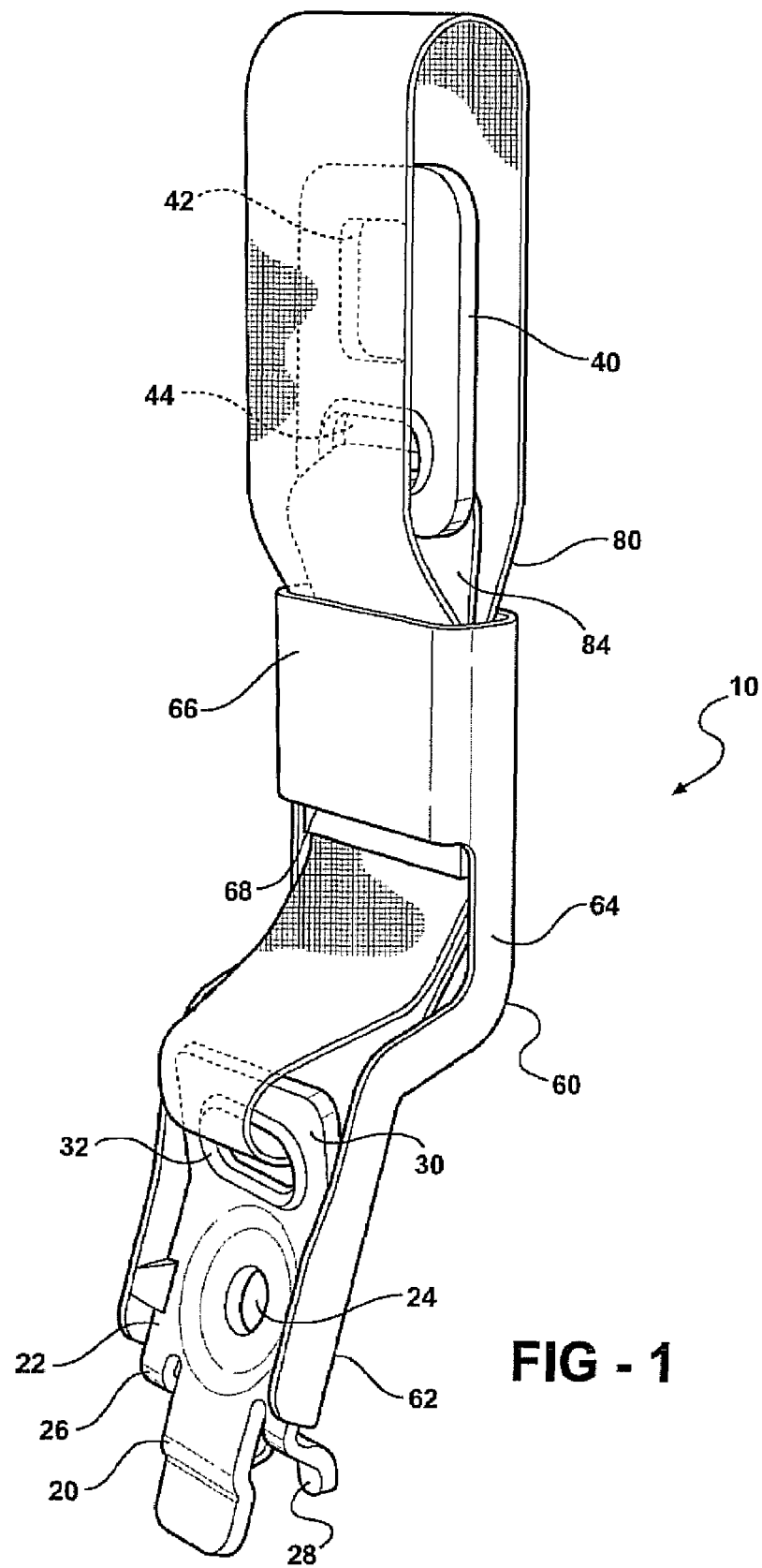
FIG. 1 is a perspective view of a tether anchor assembly according to one embodiment of the invention, shown with a receiver bracket in a use position.
Figure 2:
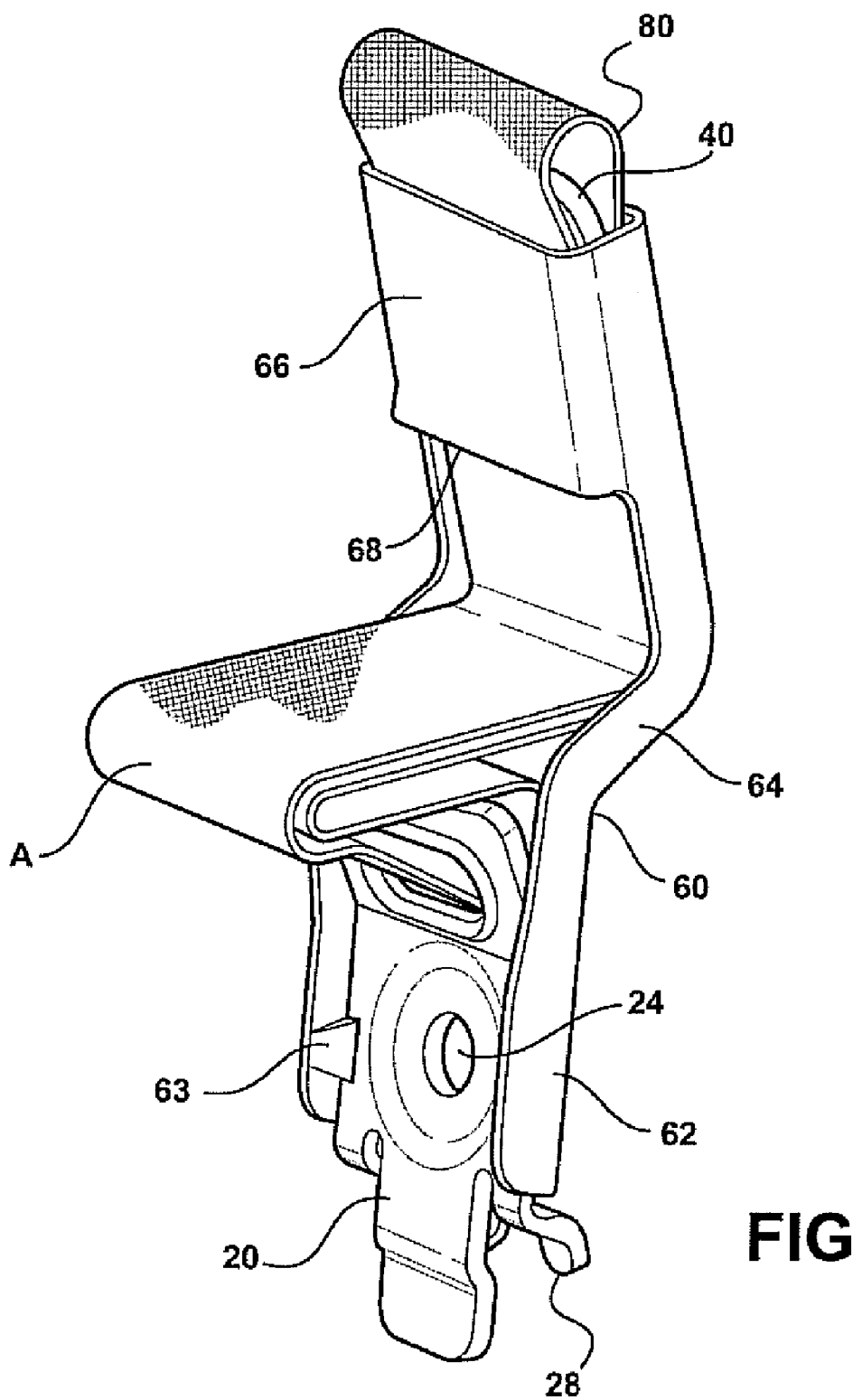
FIG. 2 is a perspective view of the tether anchor assembly with the receiver in a concealed position.
Figure 3:
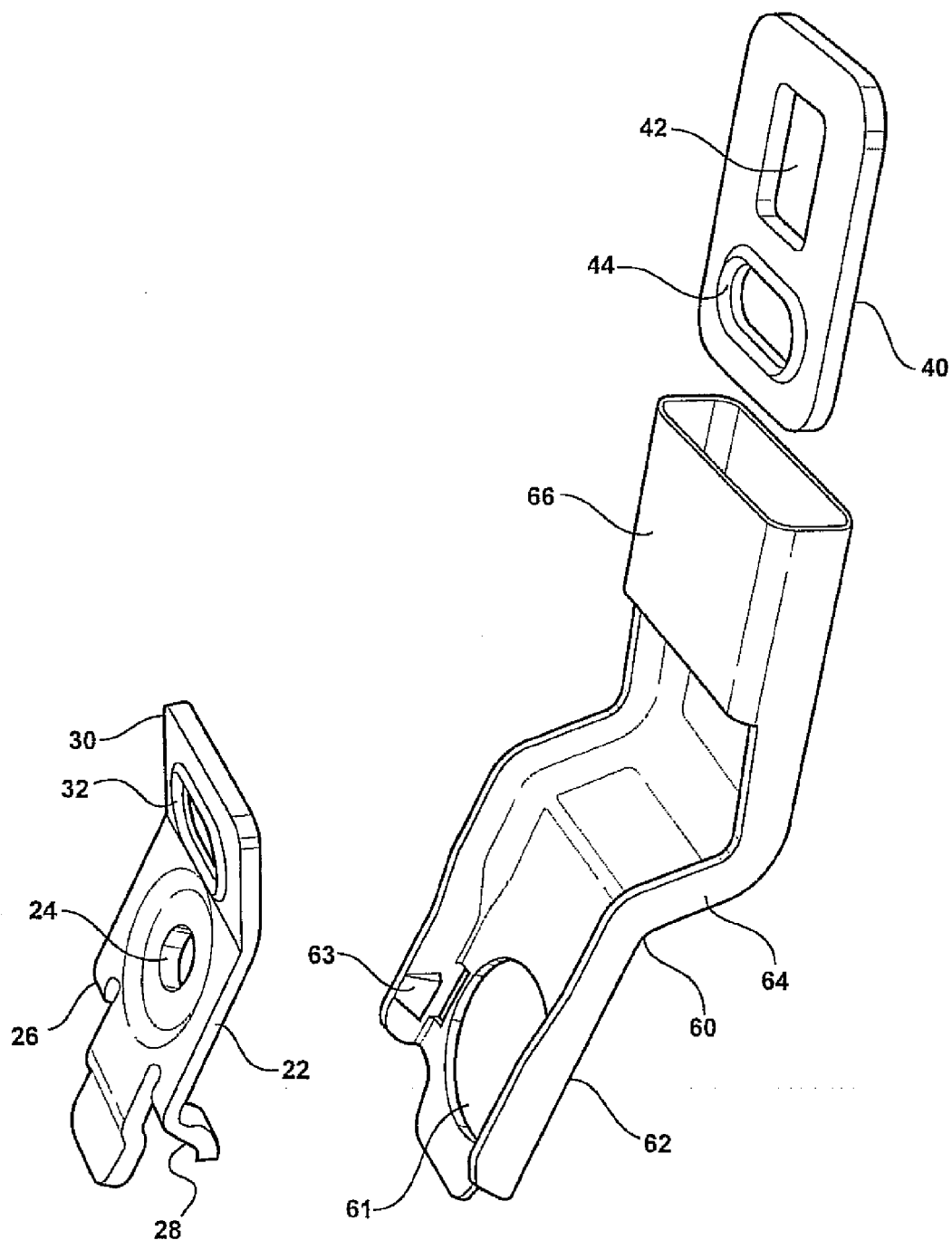
FIG. 3 is an exploded perspective view of a mounting bracket, a boot and the receiver bracket, which form part of the tether anchor assembly.

In FIGS. 1-3, a top tether anchor assembly for securing a child seat in a passenger compartment of an automotive vehicle is generally indicated at 10. The anchor assembly 10 includes a mounting bracket 20, a receiver bracket 40, a boot 60 and a strap 80. The mounting bracket 20 includes a middle portion 22. The middle portion 22 includes a hole 24 for receiving a bolt therethrough for fixedly securing the mounting bracket 20 to a wall of the passenger compartment. A pair of legs 26, 28 extends downwardly from opposite sides of the middle portion 22. The legs 26, 28 extend at an angle relative to the middle portion 22. The legs 26, 28 facilitate location of the mounting bracket 20 relative to the wall of the passenger compartment during assembly of the anchor assembly 10 to the vehicle. An upper portion 30 extends outwardly at an angle from an upper end of the middle portion 22. The upper portion 30 includes an aperture 32 for receiving the strap 80 therethrough.

The receiver bracket 40 is generally rectangular in shape and includes an upper opening 42 and a lower opening 44. The upper opening 42 receives a hook from a child seat tether when securing the child seat to the vehicle.

The boot 60 has an "S" shaped profile defined by lower 62, middle 64 and upper 66 portions. The lower portion 62 of the boot 60 has a generally U-shaped open cross section for receiving the mounting bracket 20 therein. At least one inwardly extending tab 63 is formed in the lower portion 62 for retaining tile boot 60 and mounting bracket 20 together as an assembly. The lower portion 62 also includes an opening 61 to accommodate the bolt used to secure the mounting bracket 20 to the vehicle. The upper portion 66 of the boot 60 includes a channel 68 having a closed cross section for receiving the strap and receiver bracket 40 therein The middle portion 64 of the boot 60 has an opening 67 to accommodate a bowing of excess material "A" from the strap 80 when stowed in the channel 68. An upper edge 69 of the boot 60 defining the opening is ramped for guiding the excess material A through the opening 67 as the strap 80 and receiver bracket 40 is inserted into the channel 68.

The strap 80 includes a first loop 84 that extends through the lower opening 44 of the receiver bracket 40 and a second loop 85 that extends through the aperture 32 in the mounting bracket 20. The strap 80 also includes a third loop 87 that generally surrounds both the receiver bracket 40 and the first loop 84 when disposed in the channel 68 of the boot 60. As best shown in the cross sectional view of FIG. 4, the strap 80 is formed from a single length of material, which is folded in an overlapping manner and sewn along a middle section 89 to form the loops 84, 85, 87.

At least a portion of the channel 68 has a reduced cross sectional area relative to the combined thickness of the strap 80 and receiver bracket 40, so that the strap and receiver bracket 40 do not slip completely therethrough.

Figure 4:
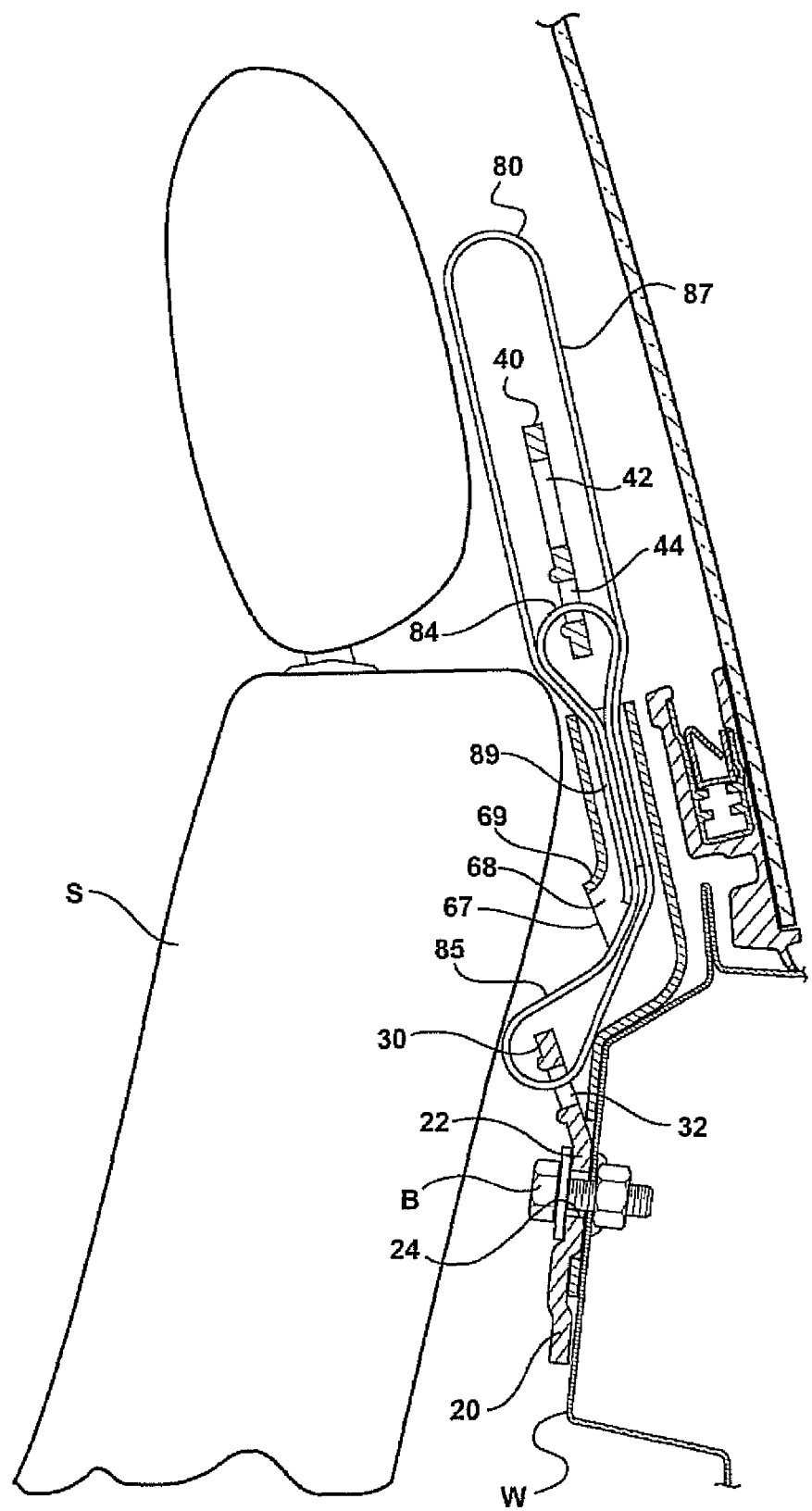
FIG. 4 is a cross sectional view of the tether anchor assembly mounted in a vehicle with a child seat tether connected thereto.

Referring to FIG. 4, the mounting bracket 20 is disposed behind a vehicle seat "S" and fixedly secured to a wall "W" in the passenger compartment of the vehicle by inserting a bolt through the hole 24 in the middle portion 22 and threading the bolt through a threaded member on the opposite side of the wall, such as a weld nut (not shown). In FIG. 1, the receiver bracket 40 and strap 80 extend outwardly from the top of the channel 68, where they are presented for securing a child seat tether anchor thereto. When a child seat is not in use, the receiver bracket 40 and the strap 80 may be concealed within the channel 68, as shown in FIG. 2.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A tether anchor assembly comprising:
   a receiver bracket for securing a child seat tether thereto;
   a mounting bracket adapted to be fixedly secured to a wall of a vehicle;
   a strap extending through the receiver and mounting brackets; and
   a boot configured to be retained to the mounting bracket, the boot having a channel for receiving and concealing the receiver bracket and the strap therein when not in use.

2. A tether anchor assembly as set forth in claim 1, wherein the receiver bracket includes a first opening for receiving the strap therethrough and a second opening for receiving the child seat tether therethrough.

3. A tether anchor assembly as set forth in claim 2, wherein the strap includes a first loop that extends through the first opening in tile receiver bracket and a second loop extending through the mounting bracket.

4. A tether anchor assembly as set forth in claim 3, wherein the strap includes a third loop that generally surrounds both the receiver bracket and the first loop when disposed in the channel of the boot.

5. A tether anchor assembly as set forth in claim 1, wherein the boot is substantially S-shaped and includes an upper portion, a middle portion and a lower portion.

6. A tether anchor assembly as set forth in claim 5, wherein the upper and lower portions of the boot are generally parallel to each other.

7. A tether anchor assembly as set forth in claim 5, wherein the channel is formed in the upper portion of the boot, the channel having a generally closed cross section for concealing the receiver bracket and the strap therein when not in use.

8. A tether anchor assembly as set forth in claim 5, wherein the lower portion includes at least one tab that secures the boot to the mounting bracket.

9. A tether anchor assembly as set forth in claim 5, wherein the middle portion has an opening that accommodates a bowing middle section of the strap when the receiver bracket is concealed in the channel of the boot.

10. A tether anchor assembly as set forth in claim 9, wherein an edge of the boot that defines the opening is ramped to guide the bowing middle section of the strap when the receiver bracket is concealed in the channel of the boot.

11. A tether anchor assembly as set forth in claim 1, wherein the mounting bracket includes a middle portion having a hole for mounting the tether anchor assembly to a vehicle with a bolt.

12. A tether anchor assembly as set forth in claim 11, wherein the mounting bracket includes an upper portion non-parallel with the middle portion, the upper portion having an aperture for receiving the strap therethrough.

13. A tether anchor assembly as set forth in claim 11, wherein the mounting bracket includes a leg extending outwardly from the middle portion to facilitate positioning of the mounting bracket during assembly to the vehicle.

* * * * *

UNITED STATES PATENT AND TRADEMARK OFFICE
CERTIFICATE OF CORRECTION

PATENT NO. : 7,407,215 B2
APPLICATION NO. : 11/612505
DATED : August 5, 2008
INVENTOR(S) : George M. Chalhoub It is certified that error appears in the above-identified patent and that said Letters Patent is hereby corrected as shown below:

Column 2, line 23, replace "tile" with --the--

Signed and Sealed this

Twenty-eighth Day of October, 2008

JON W. DUDAS
*Director of the United States Patent and Trademark Office*